(12) United States Patent
Yang et al.

(10) Patent No.: US 9,596,456 B2
(45) Date of Patent: Mar. 14, 2017

(54) HEAD MOUNTED DISPLAY SYSTEM

(71) Applicant: Quanta Computer Inc., Tao Yuan Shien (TW)

(72) Inventors: Wen-Chu Yang, New Taipei (TW); Chung-Te Li, New Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 212 days.

(21) Appl. No.: 14/332,939

(22) Filed: Jul. 16, 2014

(65) Prior Publication Data

US 2016/0021358 A1  Jan. 21, 2016

(51) Int. Cl.
*G09G 5/00* (2006.01)
*H04N 13/02* (2006.01)
(Continued)

(52) U.S. Cl.
CPC ..... *H04N 13/0271* (2013.01); *G02B 27/0093* (2013.01); *G02B 27/0172* (2013.01);
(Continued)

(58) Field of Classification Search
CPC ...... G02B 2027/0178; G02B 2027/014; G02B 27/0101; G02B 2027/0185; G02B 2027/0118; G02B 2027/0123; G02B 2027/0138; G02B 5/30; G02B 26/10; G02B 27/225; G02B 27/2228; G09G 2360/144; G09G 2340/10; G09G 2320/0285; G09G 2320/066; G09G 2330/12; G09G 2340/0464; G09G 2340/14; G09G 3/001; G09G 3/002; G09G 3/3406; G09G 3/3648; G09G 5/10; G09G 5/397; G09G 2320/00; G09G 3/3208; G09G 2340/0471; G09G 2340/0478; G09G 3/3225; G09G 3/3233; G09G 2310/0235; G09G 3/2003; G09G 3/32; G09G 3/34; G09G 2354/00; G09G 3/003; G09G 3/02; G09G 5/003; G06F 3/013; G06F 1/163; G06F 3/017; G06F 3/012; G06F 3/011; G06F 1/1637; G06F 1/1686; G06F 3/01; G06F 3/0304; G06F 3/042; G06F 3/0425; G06F 3/014; G06F 3/03547; G06F 3/041; G06F 3/0488
(Continued)

(56) References Cited

U.S. PATENT DOCUMENTS

| | | | | |
|---|---|---|---|---|
| 4,987,410 A * | 1/1991 | Berman | ............... | G02B 5/3016 345/9 |
| 7,639,893 B2 * | 12/2009 | Duan | ...................... | G06T 5/007 345/589 |
| 8,928,556 B2 * | 1/2015 | Yasue | .................. | G02B 27/017 345/8 |

* cited by examiner

*Primary Examiner* — Duc Dinh
(74) *Attorney, Agent, or Firm* — Rabin & Berdo, P.C.

(57) ABSTRACT

A head mounted display system comprises a lens set, an image capturing unit and a processing circuit. The lens set comprises a first liquid crystal panel and a second liquid crystal panel. The first liquid crystal panel comprises first liquid crystal blocks, and the second liquid crystal panel comprises second liquid crystal blocks. The image capturing unit captures front image data having a first dynamic range. The processing circuit performs tone mapping according to the front image data to generate mapping image data having a second dynamic range smaller than the first dynamic range. The processing circuit calculates regulated values according to the mapping image data. A driving circuit drives the first liquid crystal blocks and the second liquid crystal blocks according to the regulated values, respectively.

20 Claims, 10 Drawing Sheets

(51) Int. Cl.
  *G02B 27/00* (2006.01)
  *G06F 3/01* (2006.01)
  *G02B 27/01* (2006.01)
  *G09G 3/00* (2006.01)
  *G06F 1/16* (2006.01)
  *H04N 13/04* (2006.01)

(52) U.S. Cl.
  CPC .............. *G06F 1/163* (2013.01); *G06F 3/011* (2013.01); *G06F 3/013* (2013.01); *G09G 3/002* (2013.01); *H04N 13/0239* (2013.01); *H04N 13/0253* (2013.01); *H04N 13/044* (2013.01); *H04N 13/0484* (2013.01); *H04N 13/0497* (2013.01); *G02B 2027/014* (2013.01); *G02B 2027/0138* (2013.01)

(58) Field of Classification Search
  USPC ........................................................ 345/7–9
  See application file for complete search history.

HEAD MOUNTED DISPLAY SYSTEM

BACKGROUND OF THE INVENTION

Field of the Invention

The invention relates in general to an electronic device, and more particularly to a head mounted display system.

Description of the Related Art

At present, the head mounted displays are mainly classified into two types. The first type is an immersive type head mounted display, also referred to as a non-see-through head mounted display. The significant feature of the immersive type head mounted display is to completely isolate the user from the external light so that the user is completely immersed into the environment provided by the head mounted display. The second type is a see-through type head mounted display, also referred to as an optical see-through head mounted display. The significant feature of the optical see-through head mounted display is not to isolate the external light from the user so that the user can see the outside world (real image) and the image (virtual image) provided by the head mounted display concurrently. In the summer sun, the brightness may reach 10,000 Lux, but the brightness may only 1 Lux in the shaded place. The real scene is 100 dB. However, the human eye's dynamic range is about 40 dB, so the human eyes cannot see the details of the dark portion and the bright portion in a short period of time concurrently. Because the conventional optical see-through head mounted display does not isolate the external light from the user, the user cannot see the details of the dark portion and the bright portion in the real scene concurrently with the aid of the conventional optical see-through head mounted display.

SUMMARY OF THE INVENTION

The invention is directed to a head mounted display system.

According to the present invention, a head mounted display system is provided. The head mounted display system comprises a lens set, an image capturing unit and a processing circuit. The lens set comprises a first liquid crystal panel and a second liquid crystal panel. The first liquid crystal panel comprises first liquid crystal blocks, and second liquid crystal panel comprises second liquid crystal blocks. The image capturing unit captures front image data having a first dynamic range. The processing circuit performs tone mapping according to the front image data to generate mapping image data having a second dynamic range smaller than the first dynamic range. The processing circuit calculates regulated values according to the mapping image data. A driving circuit drives the first liquid crystal blocks and the second liquid crystal blocks according to the regulated values, respectively.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
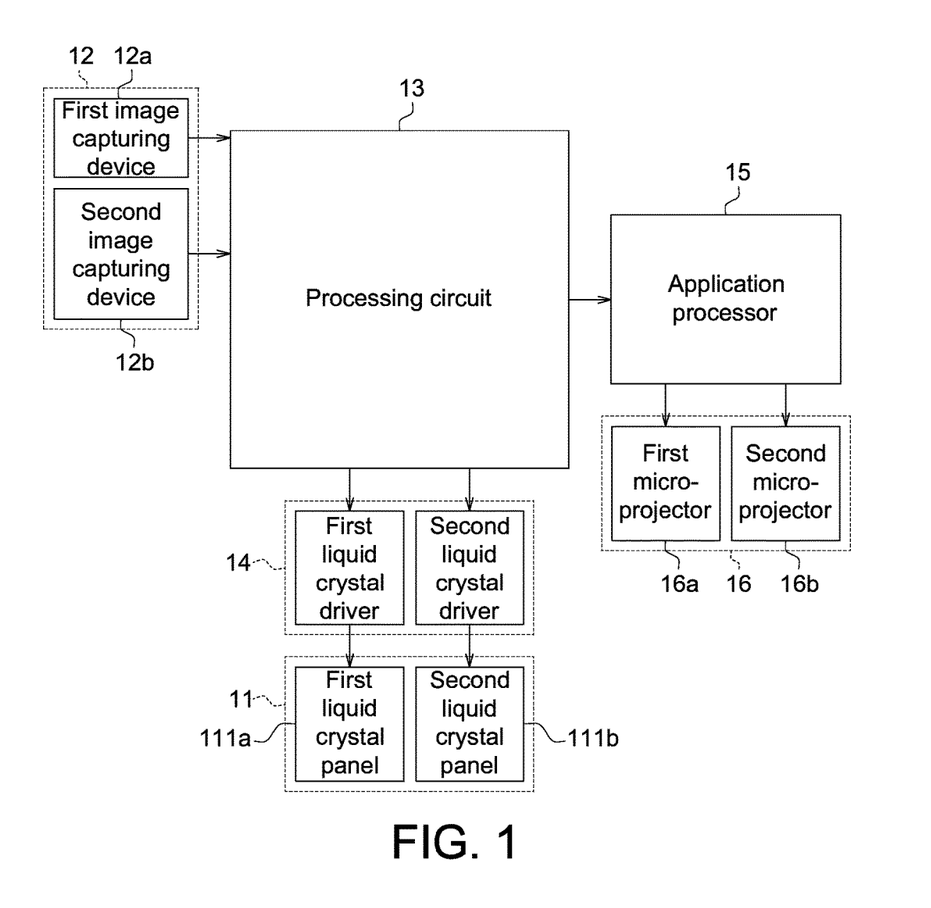
FIG. 1 is a block diagram showing a head mounted display system according to a first embodiment.
Figure 2:
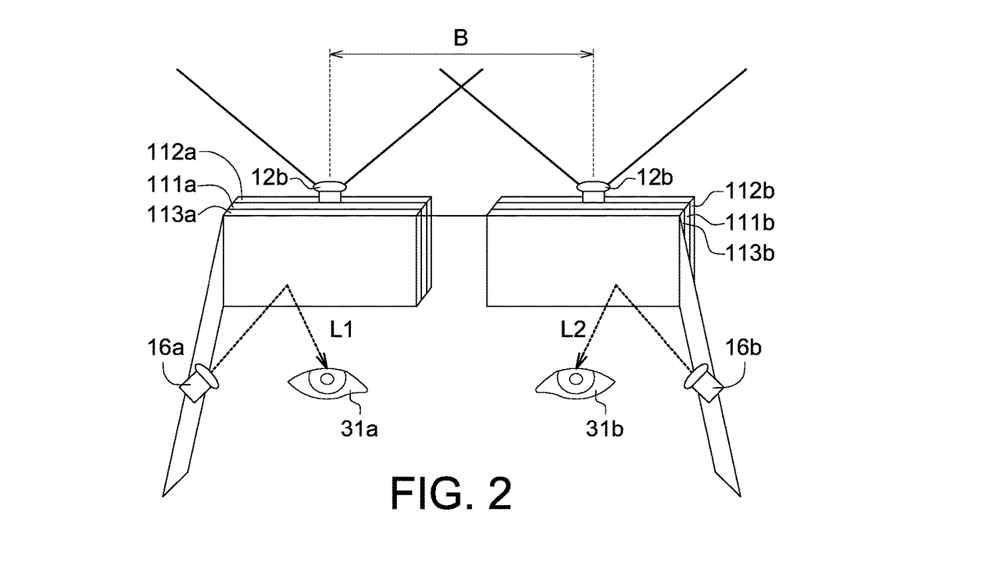
FIG. 2 is a schematic appearance view showing the head mounted display system according to the first embodiment.
Figure 3:
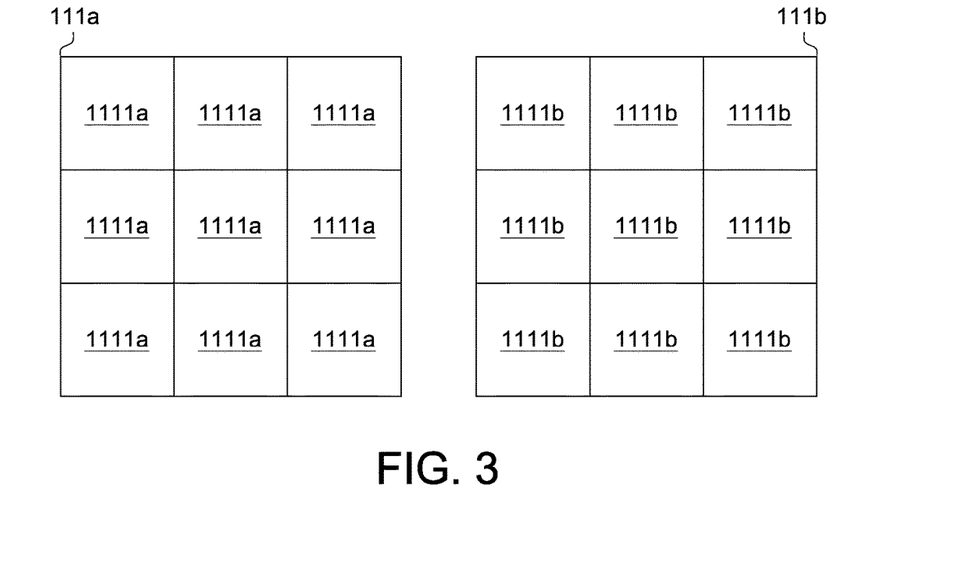
FIG. 3 is a schematic view showing a first liquid crystal panel and a second liquid crystal panel.

Please refer to FIGS. 1, 2 and 3. FIG. 1 is a block diagram showing a head mounted display system according to a first embodiment. FIG. 2 is a schematic appearance view showing the head mounted display system according to the first embodiment. FIG. 3 is a schematic view showing a first liquid crystal panel and a second liquid crystal panel. The head mounted display system 1 is, for example, an electronic eyeglasses, and comprises a lens set 11, an image capturing unit 12, a processing circuit 13, a driving circuit 14, an application processor 15 and a display unit 16. The lens set 11 comprises a first liquid crystal panel 111a, a second liquid crystal panel 111b, a first polarization structure 112a, a second polarization structure 112b, a first polarizing beam splitter (PBS) 113a and a second PBS 113b. The first liquid crystal panel 111a is disposed between the first polarization structure 112a and the first PBS 113a, and the second liquid crystal panel 111b is disposed between the second polarization structure 112b and the second PBS 113b. The first liquid crystal panel 111a comprises first liquid crystal blocks 1111a, and the liquid crystal panel 111b comprises second liquid crystal blocks 1111b. The first liquid crystal blocks 1111a and the second liquid crystal blocks 1111b are controlled by thin film transistors (TFTs). The image capturing unit 12 is implemented by, for example, a native high dynamic range (HDR) sensor, an alternate row sensor, a staggered sensor or a conventional image sensor. The display unit 16 comprises a first micro-projector 16a and a second micro-projector 16b.

If the first polarization structure 112a and the second polarization structure 112b are polarizers, then they can absorb light rays having polarization directions different from those of the first polarization structure 112a and the second polarization structure 112b to prevent the real image light rays from being reflected. The first micro-projector 16a projects polarized light L1 onto the first PBS 113a, and the polarized light L1 is reflected by the first PBS 113a to the user's eye 31a. After the external real image light rays pass through the first polarization structure 112a, only the polarized light having the polarization direction parallel to the first polarization structure 112a is remained. The remained polarized light is rotated by the liquid crystal molecules of the first liquid crystal panel 111a. Only the polarized light having the polarization direction parallel to the first PBS 113a can penetrate through the first PBS 113a, and be incident to the user's eye 31a. In an embodiment, the first polarization structure 112a and the second polarization structure 112b can be PBSs.

The second micro-projector 16b projects the polarized light L2 onto the second PBS 113b, and the second PBS 113b reflects the polarized light L2 to the users eye 31b. After the external real image light rays pass through the second polarization structure 112b, only the polarized light having the polarization direction parallel to the second polarization structure 112b is remained. The remained polarized light is rotated by the liquid crystal molecules of the second liquid crystal panel 111b. Only the polarized light having the polarization direction parallel to the second PBS 113b can penetrate through the second PBS 113b, and be incident to the user's eye 31b.

The image capturing unit 12 captures front image data having a first dynamic range. The processing circuit 13 performs tone mapping according to the front image data to generate mapping image data having a second dynamic range smaller than the first dynamic range. The processing circuit 13 calculates regulated values according to the mapping image data. The driving circuit 14 drives the liquid crystal blocks 1111a and the liquid crystal blocks 1111b according to the regulated values, respectively. The processing circuit 13 is, for example, an application specific integrated circuit (ASIC).

Furthermore, the front image data comprises a first front image and a second front image, and the mapping image data comprises a first mapping image and a second mapping image. The image capturing unit 12 comprises a first image capturing device 12a and a second image capturing device 12b. The head mounted display system 1 may further comprise infrared light-emitting diodes (LEDs), which turn on when the environment light is too dark to enhance the image qualities of the first image capturing device 12a and the second image capturing device 12b.

The driving circuit 14 comprises a first liquid crystal driver 14a and a second liquid crystal driver 14b. The first liquid crystal driver 14a and the second liquid crystal driver 14b drive the first liquid crystal panel 111a and the second liquid crystal panel 111b, respectively. The optical axis pitch B between the first image capturing device 12a and the second image capturing device 12b may be determined according to the distance between the pupils of the user's two eyes. For example, if the distance between the pupils of the users two eyes is 6.5 cm, then the optical axis pitch B is equal to 6.5 cm.

Figure 4:
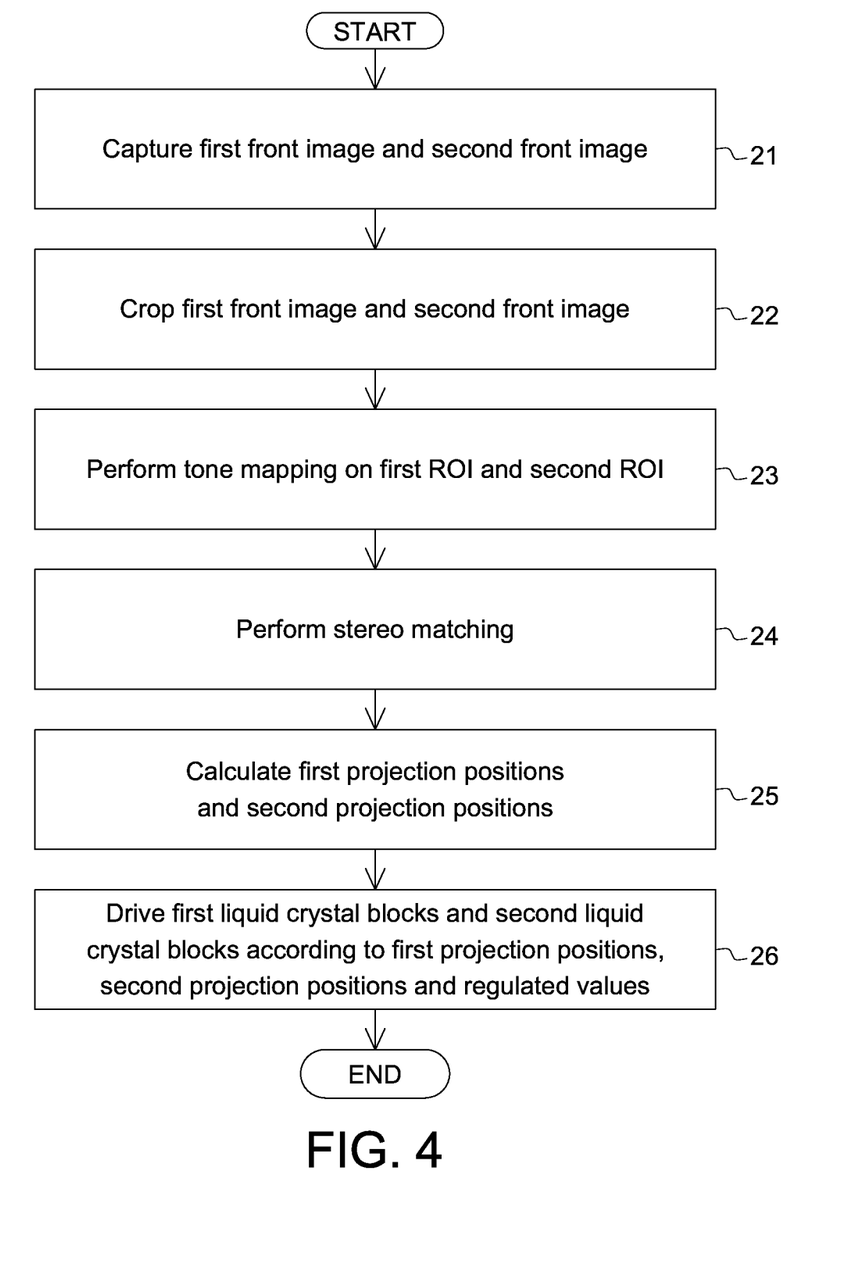
FIG. 4 is a flow chart showing operations of the head mounted display system.

Please refer to FIGS. 1 to 4, wherein FIG. 4 is a flow chart showing operations of the head mounted display system. The operation flow of the head mounted display system 1 comprises the following steps. First, as shown in step 21, the first image capturing device 12a captures the first front image, and second image capturing device 12b captures the second front image. Next, as shown in step 22, the processing circuit 13 crops the first front image according to horizontal offset information and vertical offset information to generate first region of interest (ROI), and crops the second front image according to the horizontal offset information and the vertical offset information to generate a second ROI. The horizontal offset information and the vertical offset information are provided by the application processor 15, for example.

Next, as shown in step 23, the processing circuit 13 performs tone mapping on the first ROI to generate the first mapping image, and performs tone mapping on the second ROI to generate the second mapping image. The processing circuit calculates, according to the first mapping image and the second mapping image, regulated values for driving the first liquid crystal blocks 1111a and the second liquid crystal blocks 1111b.

Then, as shown in step 24, the processing circuit 13 performs stereo matching according to the first ROI and the second ROI to generate depth information and real image coordinates. The main principle of the stereo matching is to calculate the depth information according to disparity of the same feature point in the first front image and the second front image and the similar triangles.

Next, as shown in step 25, the processing circuit 13 calculates a plurality of first projection positions of the real image coordinates projected onto the first liquid crystal panel 111a, and calculates second projection positions of the second real image coordinates projected onto the second liquid crystal panel 111b. Then, as shown in step 26, the driving circuit 14 drives the first liquid crystal blocks 1111a and the second liquid crystal blocks 1111b according to the first projection positions, the second projection positions and the regulated values.

The tone mapping is, for example, the global tone mapping or local tone mapping. The global tone mapping is, for example, adaptive logarithm mapping, and the local tone mapping is, for example, Bilateral, Gradient, Lightness or iCAM06 mapping. It is assumed a first ROI I(x, y) has the first dynamic range and n bits, and a first mapping image I'(x, y) has the second dynamic range and m bits after tone mapping, where x represents the horizontal coordinate, and y represents the vertical coordinate. The first mapping image I'(x, y) and the first ROI I(x, y) have the following attenuation formula: the attenuation value $$A(x, y) = \frac{I'(x, y) \times 2^{n-m}}{I(x, y)}.$$

The incident light ray, the output light ray, the regulated value and the bit number have the following relationship:

$$\frac{\text{Intensity of output light ray}}{\text{Intensity of incident light ray}} = \frac{1}{2} \times \frac{\text{regulated value}}{2^k - 1},$$

where k represents the bit number of the regulated value that may be controlled by the thin film transistors, and $$\frac{1}{2}$$

represents the result that the polarizer makes a certain polarized external real image light ray being absorbed. The relationship between the incident light ray, the output light ray, the regulated value and the bit number may be written as follows in conjunction with the coordinate position:

$$A'(x', y') = \frac{1}{2} \times \frac{\text{regulated value } (x', y')}{2^k - 1}.$$

If the resolution of the first liquid crystal blocks 1111a controlled by the thin film transistors in the first liquid crystal panel 111a is the same as the resolution of the first front image captured by the first image capturing device 12a, then A'(x', y')=A(x, y). That is, $$\frac{1}{2} \times \frac{\text{regulated value } (x, y)}{2^k - 1} = \frac{I'(x, y) \times 2^{n-m}}{I(x, y)}$$

and regulated value $$(x, y) = \frac{I'(x, y) \times 2^{n-m+1}}{I(x, y)} \times (2^k - 1).$$

The processing circuit 13 can obtain the regulated value for driving each first liquid crystal blocks 1111a according to the formula of calculating the regulated value. Analogically, the processing circuit 13 may also obtain the regulated value for driving each second liquid crystal blocks 1111b according to the formula of calculating the regulated value.

Figure 5:
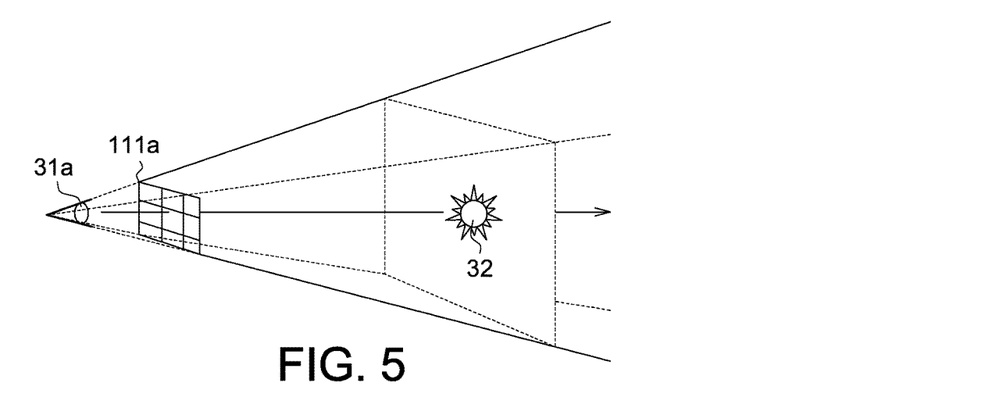
FIG. 5 is a schematic view showing an application scenario of the first liquid crystal panel.

Please refer to FIGS. 1, 3 and 5, wherein FIG. 5 is a schematic view showing an application scenario of the first liquid crystal panel. In FIG. 5, it is assumed that the users eye 31a sees the scene through the first liquid crystal panel 111a, wherein the middle of the scene has an extremely harsh high-brightness real scene object 32 (e.g., the sun), and the other portions of the scene has the ordinary brightness. The first liquid crystal panel 111a is cut into first liquid crystal blocks 1111a controlled by several thin film transistors, respectively. The processing circuit 13 can set the lower regulated value on the first liquid crystal blocks 1111a at the middle of the first liquid crystal panel 111a through the tone mapping, so that a little sun light penetrates through the first liquid crystal blocks 1111a at the middle of the first liquid crystal panel 111a. Correspondingly, the processing circuit 13 sets the higher regulated value on the other first liquid crystal blocks 1111a, so that more real image light penetrates through the other first liquid crystal blocks 1111a. In short, the head mounted display system 1 can control different first liquid crystal blocks 1111a according to different regulated values, so that different first liquid crystal blocks 1111a have different real image light transmission rates. Consequently, the dynamic range (e.g., 100 dB) of the real world HDR scene can be compressed into the dynamic range (e.g., 40 dB) suitable for the human eye. Because the first front image and the second front image are obtained from the first image capturing device 12a and the second image capturing device 12b, the resolutions of the first liquid crystal panel 111a and the second liquid crystal panel 111b need to be smaller than or equal to the resolutions of the first image capturing device 12a and the second image capturing device 12b, respectively.

Figure 6:
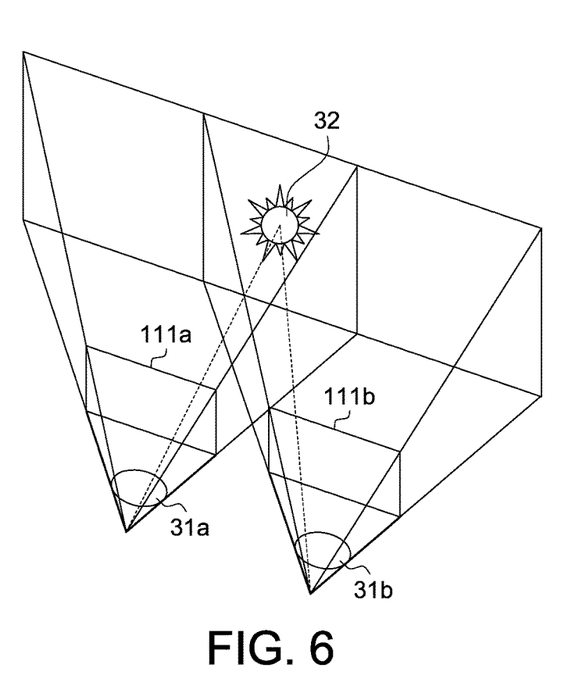
FIG. 6 is a schematic view showing an application scenario of the first liquid crystal panel and the second liquid crystal panel.

Please refer to FIGS. 1, 3 and 6, wherein FIG. 6 is a schematic view showing an application scenario of the first liquid crystal panel and the second liquid crystal panel. The users eyes 31a and 31b can look at the front real scene through the first liquid crystal panel 111a and the second liquid crystal panel 111b, respectively. Thus, the processing circuit 13 calculates the real scene onto the first liquid crystal panel 111a and the second liquid crystal panel 111b through the first front image and the second front image, respectively, and then finds the projection positions of the real scene object 32 on the first liquid crystal panel 111a and the second liquid crystal panel 111b. In other words, the processing circuit 13 determines which first liquid crystal blocks 1111a and which second liquid crystal blocks 1111b correspond to the real scene object 32 by way of projection.

Figure 7:
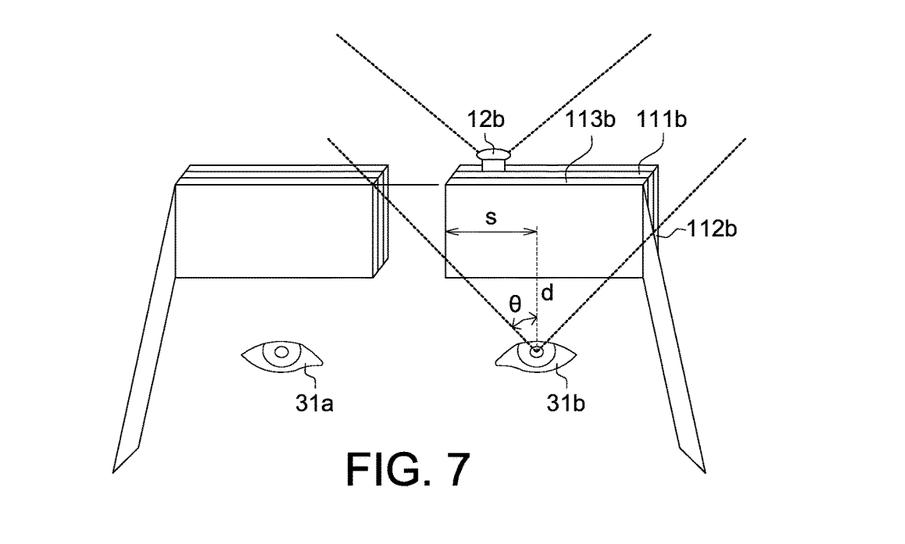
FIG. 7 is a schematic view showing a viewing angle calculation of the image capturing unit.
Figure 8:
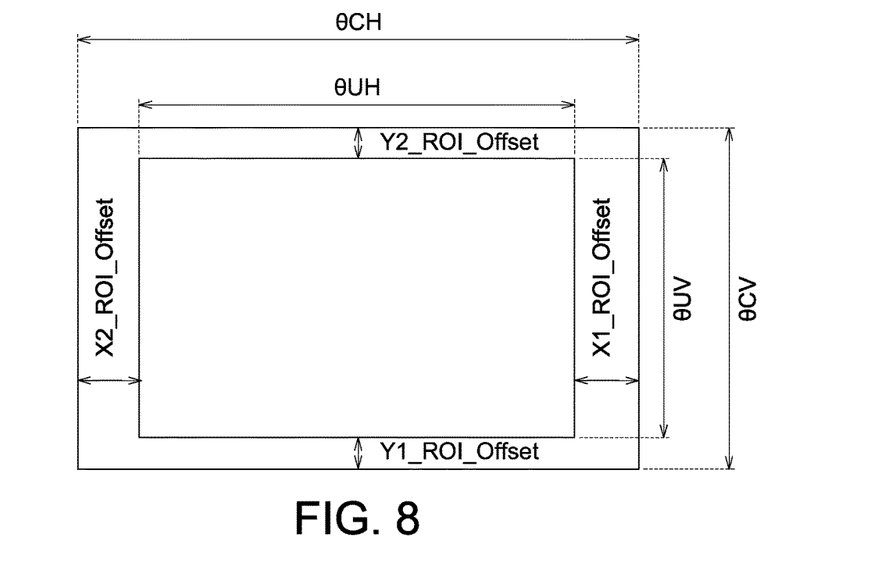
FIG. 8 is a schematic view showing an initial ROI calibration.

Please refer to FIGS. 1, 7 and 8, wherein FIG. 7 is a schematic view showing a viewing angle calculation of the image capturing unit, and FIG. 8 is a schematic view showing an initial ROI calibration.

Ideally, the second front image captured by the second image capturing device 12b must be fit with the scene viewed by the user's eye 31b from the second polarization structure 112b, the second liquid crystal panel 111b and the second PBS 113b. Because different persons have different wearing habits, after the viewing angle of the second image capturing device 12b is decided, the user's wearing habit can be further calibrated. If the users eye 31b looks straightly ahead, then a distance d between the pupils of the user's eye 31b and the second PBS 113b is obtained, and the distance s is one half of the horizontal length of the second PBS 113b. Thus, the angle $$\theta = \tan^{-1}\frac{s}{d},$$

and the viewing angle of the second image capturing device 12b is 2θ. The viewing angle calculation of the first image capturing device 12a is also the same as that mentioned hereinabove.

When the user firstly wears the head mounted display system 1, the processing circuit 13 performs a region of interest (ROI) calibration to generate the horizontal offset information and the vertical offset information. The horizontal offset information comprises, for example, a horizontal offset X1_ROI_Offset and a horizontal offset X2_ROI_Offset, and the vertical offset information comprises, for example, a vertical offset Y1_ROI_Offset and a vertical offset Y2_ROI_Offset. When the processing circuit 13 performs the ROI calibration, the head mounted display system 1 asks the user to look straightly ahead. Next, the second image capturing device 12b captures the second front image. The horizontal viewing angle of the second image capturing device 12b in FIG. 8 is θCH, and the vertical viewing angle of the second image capturing device 12b in FIG. 8 is θCV. The horizontal viewing angle of the user in FIG. 8 is θUH, and the vertical viewing angle of the user in FIG. 8 is θUV. The second front image may be imaged on the users eyes 31a and 31b through the display unit 16. Then, the horizontal viewing angle correction and the vertical viewing angle correction are performed so that the horizontal viewing angle θCH and the horizontal viewing angle θUH of the calibrated second image capturing device 12b match with each other, and the vertical viewing angle θCV and the vertical viewing angle θUV of the calibrated second image capturing device 12b match with each other.

Taking the horizontal offset X1_ROI_Offset as an example, and assuming that X1_ROI_Offset is set to 20 pixels at the beginning. In this case, the application processor 15 horizontally crops 20 pixels on the right side of the second front image, and the cropped second front image is imaged on the user's eyes 31a and 31b through the display unit 16. The head mounted display system 1 asks the user about whether the right horizontal viewing angles are matched. If not, then the horizontal offset X1_ROI_Offset is finely tuned, and the user is asked again. The ROI calibration repeats the above-mentioned processes until the user admits that the current right horizontal viewing angles are matched. Analogically, the horizontal offset X2_ROI_Offset, the vertical offset Y1_ROI_Offset and the vertical offset Y2_ROI_Offset may also be obtained in the similar manner. The application processor 15 records the horizontal offset X1_ROI_Offset, the horizontal offset X2_ROI_Offset, the vertical offset Y1_ROI_Offset and the vertical offset Y2_ROI_Offset. Thereafter, the head mounted display system 1 can crop the first front image and the second front image according to the horizontal offset X1_ROI_Offset, the horizontal offset X2_ROI_Offset, the vertical offset Y1_ROI_Offset and the vertical offset Y2_ROI_Offset.

Figure 9:
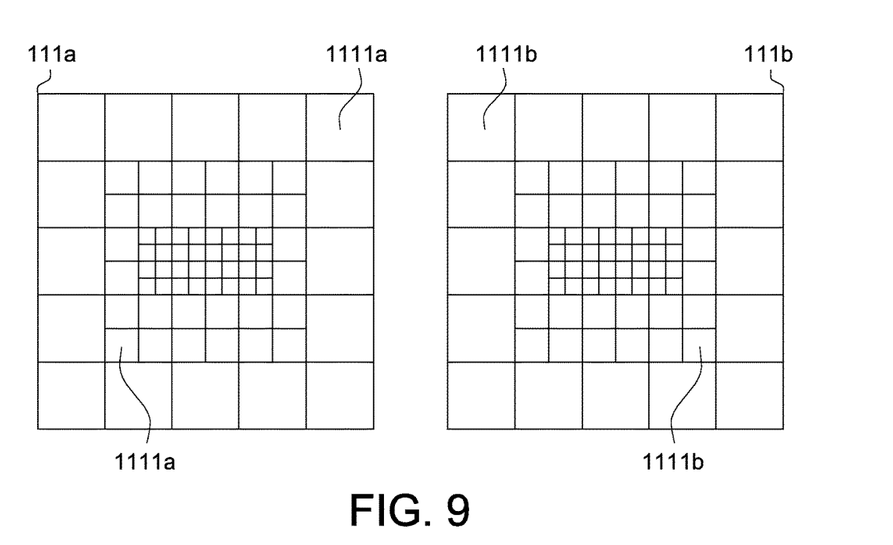
FIG. 9 is a second schematic view showing the first liquid crystal panel and the second liquid crystal panel.
Figure 10:
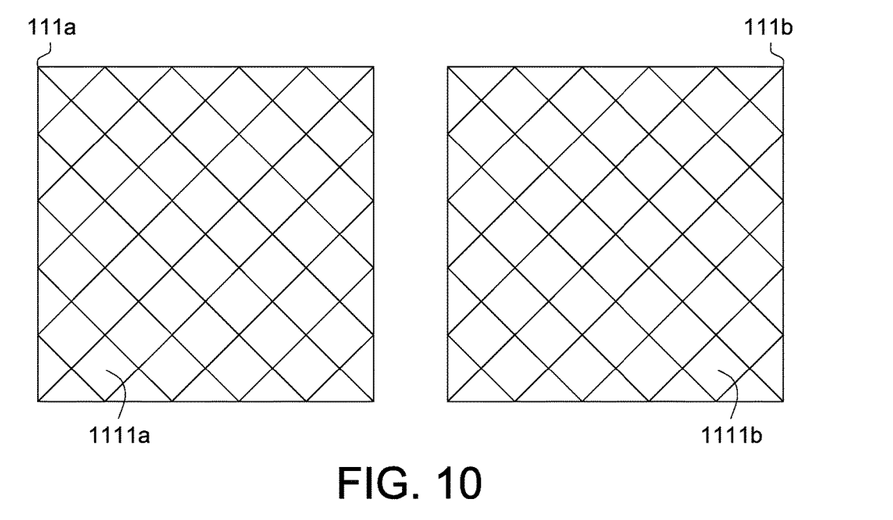
FIG. 10 is a third schematic view showing the first liquid crystal panel and the second liquid crystal panel.
Figure 11:
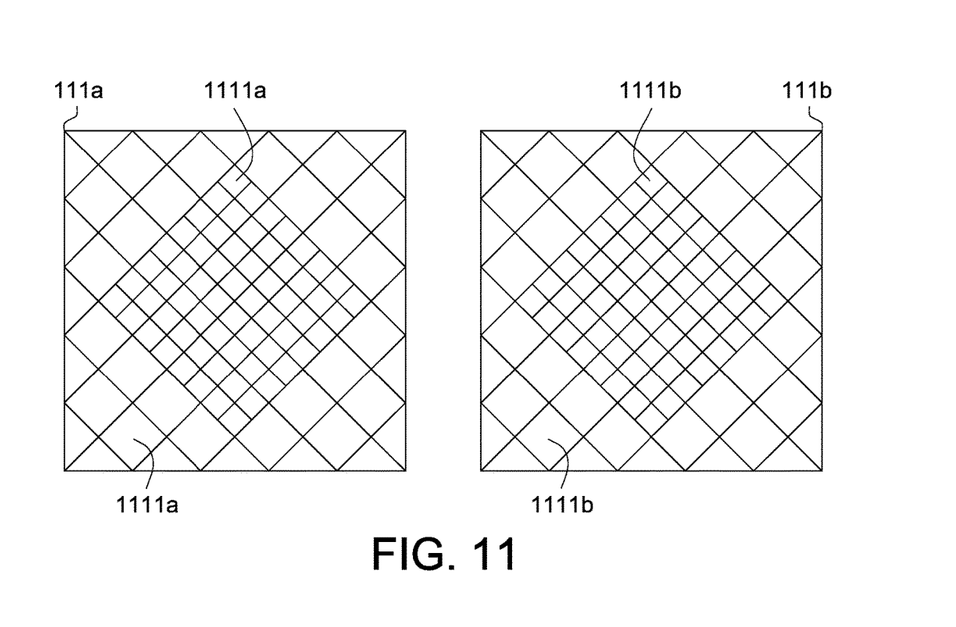
FIG. 11 is a fourth schematic view showing the first liquid crystal panel and the second liquid crystal panel.

Please refer to FIGS. 9, 10 and 11, wherein FIG. 9 is a second schematic view showing the first liquid crystal panel and the second liquid crystal panel, FIG. 10 is a third schematic view showing the first liquid crystal panel and the second liquid crystal panel, and FIG. 11 is a fourth schematic view showing the first liquid crystal panel and the second liquid crystal panel. The main differences between FIGS. 9 and 3 reside in that the first liquid crystal blocks 1111a of FIG. 9 have different sizes, and the second liquid crystal blocks 1111b have different sizes. In the first liquid crystal panel 111a and second liquid crystal panel 111b, the portion closer to the middle has the higher resolution. That is, more first liquid crystal blocks 1111a and more second liquid crystal blocks 1111b are divided at the portion closer to the middle. The main differences between FIGS. 10 and 3 reside in that the first liquid crystal blocks 1111a and the second liquid crystal blocks 1111b of FIG. 10 have the rhombus shape to ease the block effect. The main differences between FIGS. 11 and 9 reside in that the first liquid crystal blocks 1111a and the second liquid crystal blocks 1111b of FIG. 11 have the rhombus shape to ease the block effect.

Figure 12:
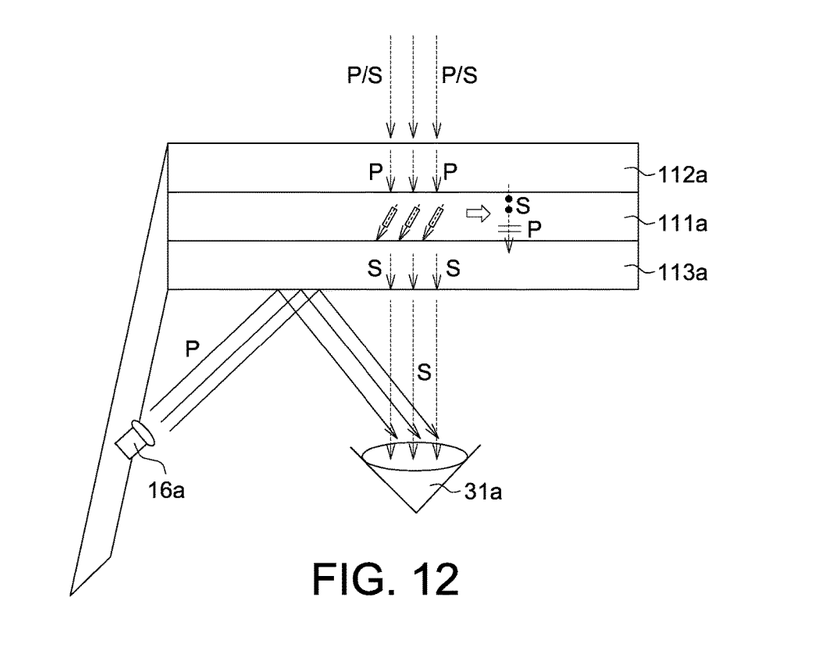
FIG. 12 is a schematic view showing light rays of the head mounted display system according to the first embodiment.
Figure 13:
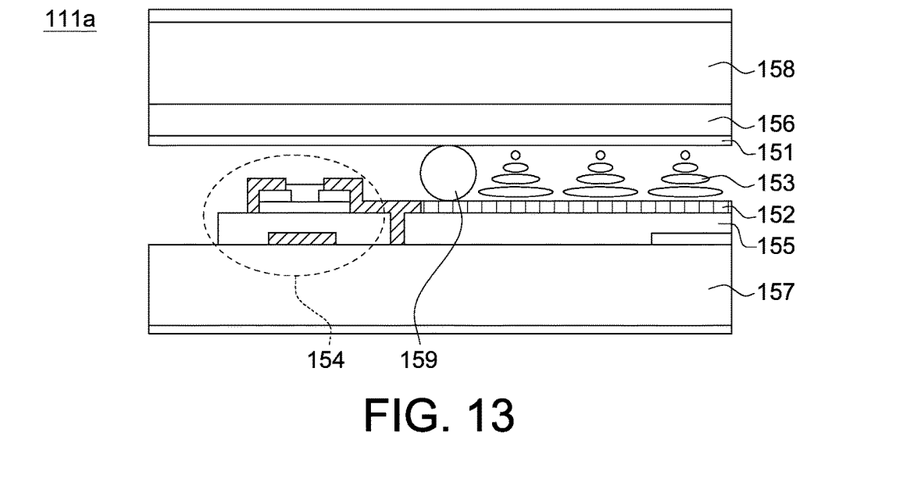
FIG. 13 is a schematic view showing a structure of the first liquid crystal panel.

Please refer to FIGS. 1, 12 and 13, wherein FIG. 12 is a schematic view showing light rays of the head mounted display system according to the first embodiment, and FIG. 13 is a schematic view showing a structure of the first liquid crystal panel. The polarization direction of each of the first polarization structure 112a and the second polarization structure 112b is the horizontal polarization direction. The polarization direction of the polarized light P projected by the first micro-projector 16a and the second micro-projector 16b is the horizontal polarization direction. The polarization of each of the PBS 11a and the PBS 11b is to transmit the S polarized light, and to reflect the P polarized light.

Because each of the first PBS 113a and the second PBS 113b is to transmit the S polarized light, and to reflect the P polarized light, then the polarized light P projected by the first micro-projector 16a and the second micro-projector 16b is reflected, by the first PBS 113a and the second PBS 113b, to the users eyes 31a and 31b. The polarized light P of the external real image light rays passes through the first polarization structure 112a and the second polarization structure 112b is rotated into the polarized light S through the first liquid crystal panel 111a and second liquid crystal panel 111b, and is incident to the users eyes 31a and 31b through the first PBS 113a and the second PBS 113b. So, the normal bright state is presented in the condition when no electric field is applied to the first liquid crystal panel 111a and the second liquid crystal panel 111b.

The structure of the second liquid crystal panel 111b is similar to that of the first liquid crystal panel 111a. In order to facilitate the illustration, FIG. 13 will be described with reference to the liquid crystal panel 111a as an example. In addition to an alignment film 151, an alignment film 152 and liquid crystal molecules 153, the first liquid crystal panel 111a further comprises thin film transistors 154, pixel electrodes 155, common electrodes 156, a glass substrate 157, a glass substrate 158 and spacers 159. The spacers 159 are disposed between the alignment film 151 and the alignment film 152. The pixel electrodes 155 are disposed below the alignment film 152, and the glass substrate 157 is disposed below the pixel electrodes 155. The common electrodes 156 are disposed above the alignment film 151, and the glass substrate 158 is disposed above the common electrodes 156.

After the thin film transistor 154 turns on, a voltage difference between the pixel electrodes 155 and the common electrode 156 generates an externally applied electric field, which causes the liquid crystal molecules 153 to rotate. The polarization direction of the polarized light P passing through the liquid crystal molecules 153 is also rotated, so that polarized light P and polarized light S (see FIG. 11) with different components are generated. However, only the component of the polarized light S can pass through the first PBS 113a and the second PBS 113b, and is then incident to the users eyes 31a and 31b. It can be obtained that controlling the voltage value of the pixel electrode 155 can control the rotation degree of the liquid crystal molecules 153, and thus control the components of the polarized light S passing through the first PBS 11a and the second PBS 11b. Consequently, it is equivalent to the controlling of the brightness ratio of the external physical light rays entering the users eyes 31a and 31b.

Second Embodiment

Figure 14:
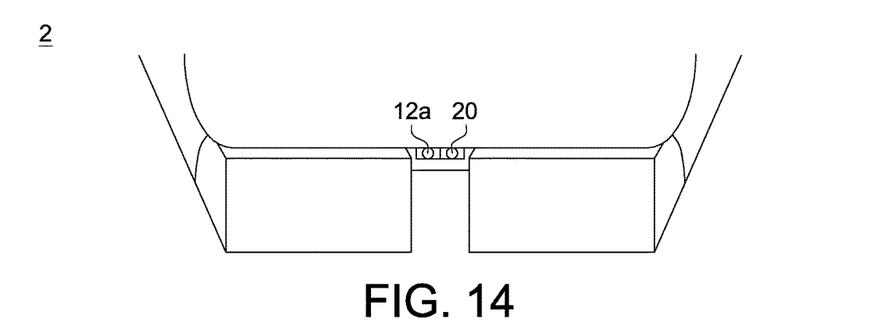
FIG. 14 is a schematic appearance view showing a head mounted display system according to a second embodiment.

Please refer to FIGS. 1, 3 and 14, wherein FIG. 14 is a schematic appearance view showing a head mounted display system 2 according to the second embodiment. The main differences between the second embodiment and the first embodiment reside in that the head mounted display system 2 only has the first image capturing device 12a, but does not have the second image capturing device 12b. In the modified head mounted display system 2, a time of flight (TOF) camera 20 provides the depth information. The processing circuit 13 calculates the real image coordinates according to the depth information and the first front image. The processing circuit 13 calculates the first projection positions of the real image coordinates projected onto the first liquid crystal panel 111a, and calculates the second projection positions of the real image coordinates projected onto the second liquid crystal panel 111b. The driving circuit 14 drives the first liquid crystal blocks 1111a and the second liquid crystal blocks 1111b according to the first projection positions, the second projection positions and the regulated values.

Third Embodiment

Figure 15:
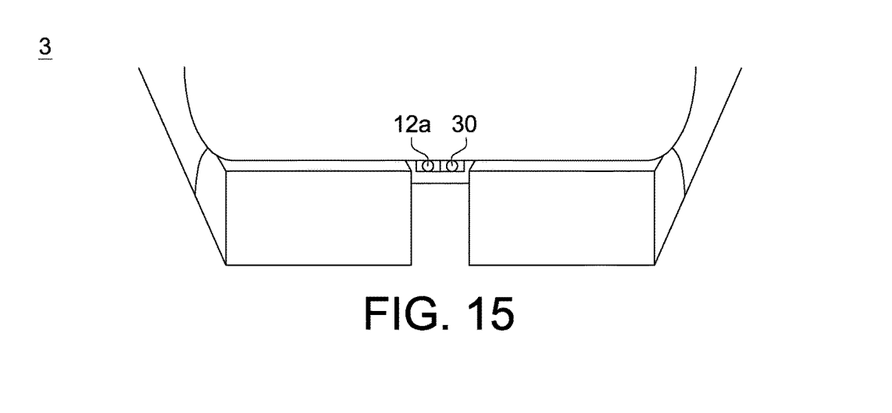
FIG. 15 is a schematic appearance view showing a head mounted display system according to a third embodiment.

Please refer to FIGS. 1, 3 and 15, wherein FIG. 15 is a schematic appearance view showing a head mounted display system 3 according to the third embodiment. The main differences between the third embodiment and the first embodiment reside in that the head mounted display system 3 only has the first image capturing device 12a, but does not have the second image capturing device 12b. In the modified head mounted display system 3, a structured light camera 30 provides the depth information. The processing circuit 13 calculates the real image coordinates according to the depth information and the first front image. The processing circuit 13 calculates the first projection positions of the real image coordinates projected onto the first liquid crystal panel 111a, and calculates the second projection positions of the real image coordinates projected onto the second liquid crystal panel 111b. The driving circuit 14 drives the first liquid crystal blocks 1111a and the second liquid crystal blocks 1111b according to the first projection positions, the second projection positions and the regulated values.

Fourth Embodiment

Figure 16:
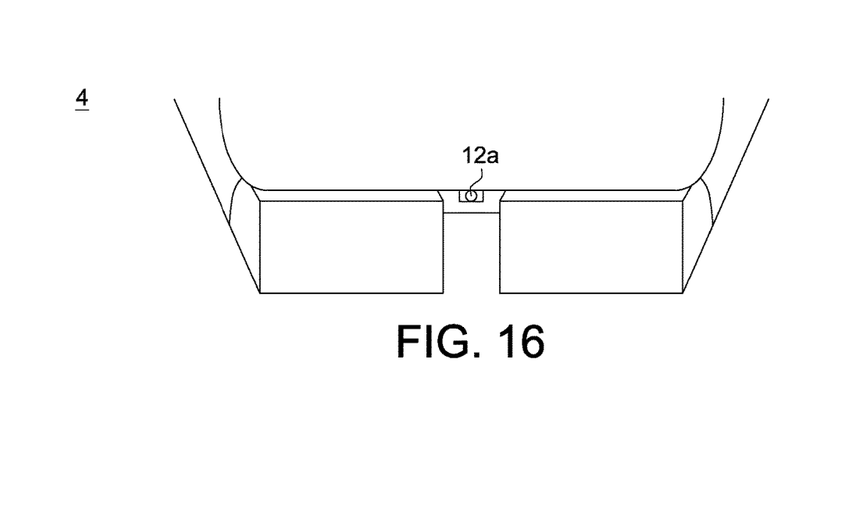
FIG. 16 is a schematic appearance view showing a head mounted display system according to a fourth embodiment.

Please refer to FIGS. 1, 3 and 16, wherein FIG. 16 is a schematic appearance view showing a head mounted display system 4 according to the fourth embodiment. The main differences between the fourth embodiment and the first embodiment resides in that the head mounted display system 4 only has the first image capturing device 12a, but does not have the second image capturing device 12b. Because the number of the image capturing device used is decreased, the manufacturing costs can be further decreased.

Fifth Embodiment

Figure 17:
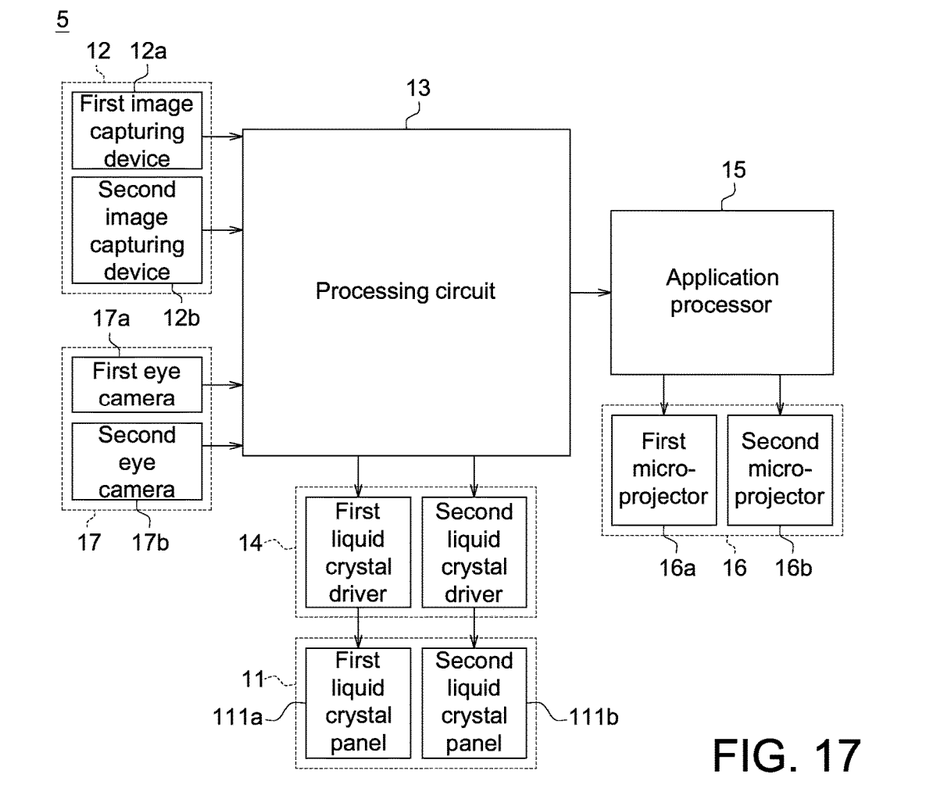
FIG. 17 is a block diagram showing a head mounted display system according to a fifth embodiment.
Figure 18:
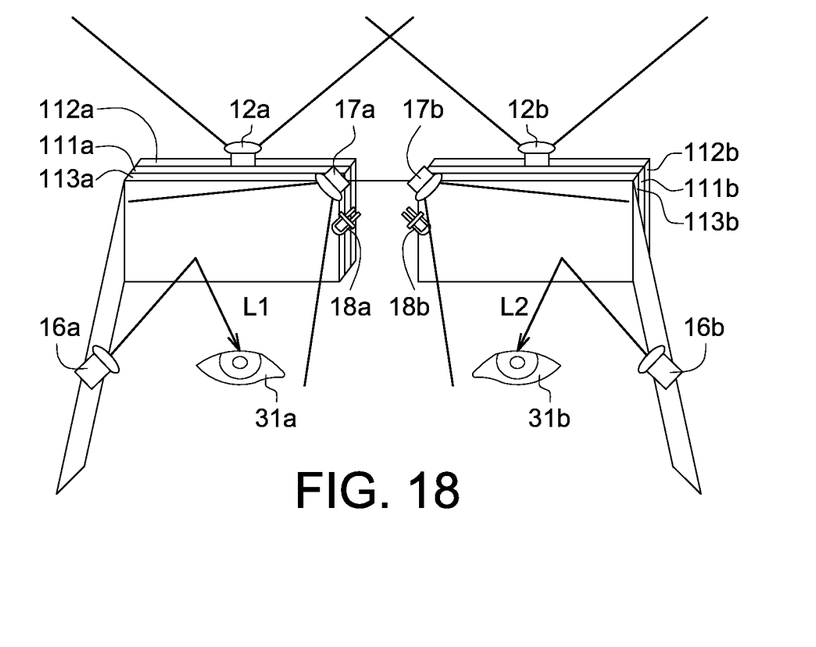
FIG. 18 is a schematic appearance view showing a head mounted display system according to the fifth embodiment.
Figure 19:
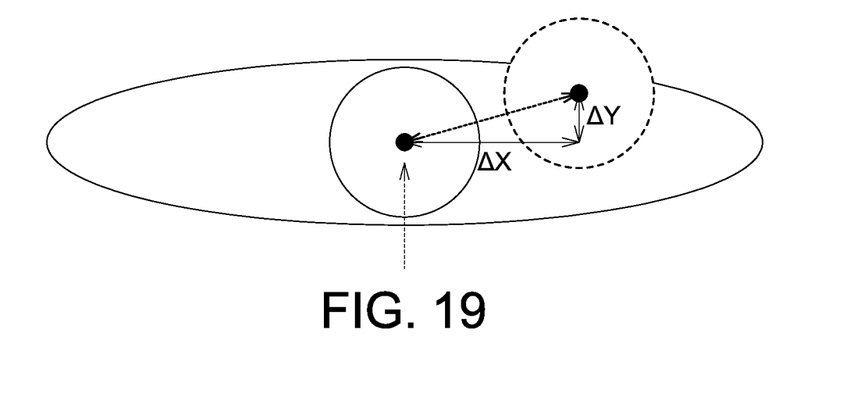
FIG. 19 is a schematic view showing a pupil position offset.

Please refer to FIGS. 3, 17, 18 and 19, wherein FIG. 17 is a block diagram showing a head mounted display system 5 according to the fifth embodiment, FIG. 18 is a schematic appearance view showing a head mounted display system 5 according to the fifth embodiment, and FIG. 19 is a schematic view showing a pupil position offset. The main differences between the fifth embodiment and the first embodiment reside in that the head mounted display system 5 further comprises an eye image capturing unit 17, an infrared LED 18a and an infrared LED 18b, and that the eye image capturing unit 17 captures the users eye image data. The processing circuit 13 calculates the pupil offset information according to the eye image data. The processing circuit 13 corrects the first projection position according to the pupil offset information, and corrects the second projection position according to the pupil offset information.

The eye image capturing unit 17 comprises a first eye camera 17a and a second eye camera 17b. The first eye camera 17a captures the first eye image (e.g., left eye) of the eye image data, and the second eye camera captures the second eye image (e.g., right eye) of the eye image data. When the environment light is too dark, the infrared LED 18a and the infrared LED 18b can be turned on to enhance the image quality.

The processing circuit 13 calculates the first pupil offset of the pupil offset information according to the first eye image, and corrects the first projection position according to the first pupil offset. The processing circuit 13 calculates the second pupil offset of the pupil offset information according to the second eye image, and corrects the second projection position according to the second pupil offset. For example, the first pupil offset is, for example, the pupil offset ($\Delta X$, $\Delta Y$). The processing circuit 13 corrects the first projection position according to the pupil offset ($\Delta X$, $\Delta Y$). Analogically, the second projection position may also be corrected according to the method mentioned hereinabove.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A head mounted display system, comprising:
   a lens set, comprising:
      a first liquid crystal panel comprising a plurality of first liquid crystal blocks; and
      a second liquid crystal panel comprising a plurality of second liquid crystal blocks;
   an image capturing unit for capturing front image data having a first dynamic range;
   a processing circuit for performing tone mapping according to the front image data to generate mapping image data having a second dynamic range smaller than the first dynamic range, the processing circuit calculating a plurality of regulated values according to the mapping image data, wherein the processing circuit performs stereo matching according to a first region of interest (ROI) and a second ROI to generate depth information and a plurality of real image coordinates, calculates a plurality of first projection positions of the real image coordinates projected onto the first liquid crystal panel, and calculates a plurality of second projection positions of the real image coordinates projected onto the second liquid crystal panel; and
   a driving circuit for driving the first liquid crystal blocks and the second liquid crystal blocks according to the first projection positions, the second projection positions and the regulated values.

2. The head mounted display system according to claim 1, wherein the image capturing unit comprises:
   a first image capturing device for capturing a first front image of the front image data; and
   a second image capturing device for capturing a second front image of the front image data,
   wherein the processing circuit performs the tone mapping according to the first front image to generate a first mapping image of the mapping image data, performs the tone mapping according to the second front image to generate a second mapping image of the mapping image data, and calculates the regulated values according to the first mapping image and the second mapping image.

3. The head mounted display system according to claim 2, wherein the processing circuit crops the first front image according to horizontal offset information and vertical offset information to generate the first ROI, and performs the tone mapping on the first ROI to generate the first mapping image, and the processing circuit crops the second front image according to the horizontal offset information and the vertical offset information to generate the second ROI, and performs the tone mapping on the second ROI to generate the second mapping image.

4. The head mounted display system according to claim 1, further comprising:
   an eye image capturing unit for capturing eye image data,
   wherein the processing circuit calculates pupil offset information according to the eye image data, corrects the first projection positions according to the pupil offset information, and corrects the second projection positions according to the pupil offset information.

5. The head mounted display system according to claim 4, wherein the eye image capturing unit comprises:
a first eye camera for capturing a first eye image of the eye image data; and
a second eye camera for capturing a second eye image of the eye image data,
wherein the processing circuit calculates a first pupil offset of the pupil offset information according to the first eye image, corrects the first projection positions according to the first pupil offset, calculates a second pupil offset of the pupil offset information according to the second eye image, and corrects the second projection positions according to the second pupil offset.

6. The head mounted display system according to claim 3, wherein the processing circuit performs a ROI calibration to generate the horizontal offset information and the vertical offset information.

7. The head mounted display system according to claim 1, wherein the image capturing unit comprises:
a first image capturing device for capturing a first front image of the front image data,
wherein the processing circuit performs the tone mapping according to the first front image to generate a first mapping image of the mapping image data, and calculates the regulated values according to the first mapping image.

8. The head mounted display system according to claim 7, wherein the processing circuit crops the first front image according to horizontal offset information and vertical offset information to generate the first ROI, and performs the tone mapping on the first ROI to generate the first mapping image.

9. The head mounted display system according to claim 8, further comprising:
a time of flight (TOF) camera for providing the depth information, wherein the processing circuit calculates a plurality of real image coordinates according to the depth information and the first front image.

10. The head mounted display system according to claim 8, further comprising:
a structured light camera for providing the depth information, wherein the processing circuit calculates a plurality of real image coordinates according to the depth information and the first front image.

11. The head mounted display system according to claim 8, wherein the processing circuit performs a ROI calibration to generate the horizontal offset information and the vertical offset information.

12. The head mounted display system according to claim 1, wherein the lens set further comprises a first polarization structure, a second polarization structure, a first polarizing beam splitter (PBS) and a second PBS, the first liquid crystal panel is disposed between the first polarization structure and the first PBS, and the second liquid crystal panel is disposed between the second polarization structure and the second PBS.

13. The head mounted display system according to claim 12, wherein the first polarization structure and the second polarization structure are polarizers.

14. The head mounted display system according to claim 12, wherein the first polarization structure and the second polarization structure are PBSs.

15. The head mounted display system according to claim 1, wherein the image capturing unit is a native HDR sensor.

16. The head mounted display system according to claim 1, wherein the image capturing unit is an alternate row sensor.

17. The head mounted display system according to claim 1, wherein the image capturing unit is a staggered sensor.

18. The head mounted display system according to claim 1, wherein the image capturing unit is an image sensor.

19. The head mounted display system according to claim 1, wherein the tone mapping is global tone mapping.

20. The head mounted display system according to claim 1, wherein the tone mapping is local tone mapping.

* * * * *